United States Patent
Takada et al.

(10) Patent No.: US 7,075,938 B1
(45) Date of Patent: Jul. 11, 2006

(54) COMMON BUFFER MEMORY CONTROL APPARATUS

(75) Inventors: Syuji Takada, Kawasaki (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/258,442

(22) Filed: Feb. 26, 1999

(30) Foreign Application Priority Data

Mar. 13, 1998 (JP) .................................. 10-062530

(51) Int. Cl.
 *H04L 12/28* (2006.01)
(52) U.S. Cl. .................. 370/395.71; 370/398; 370/412
(58) Field of Classification Search ................ 370/389, 370/391, 398, 395.7, 395.71, 360, 378, 428, 370/395.72, 412, 429
See application file for complete search history.

(56) References Cited

U.S. PATENT DOCUMENTS

| | | | | |
|---|---|---|---|---|
| 5,463,622 A | * | 10/1995 | Keller et al. | ................. 370/399 |
| 5,535,197 A | * | 7/1996 | Cotton | ................... 370/395.72 |
| 5,742,600 A | * | 4/1998 | Nishihara | ................. 370/395.6 |
| 5,768,274 A | * | 6/1998 | Murakami et al. | ........ 370/395.7 |
| 6,016,317 A | * | 1/2000 | Sakurai et al. | ............... 370/391 |
| 6,185,209 B1 | * | 2/2001 | Wicklund | .............. 370/395.71 |

FOREIGN PATENT DOCUMENTS

JP 3-88450 4/1991

\* cited by examiner

*Primary Examiner*—Duc Ho
*Assistant Examiner*—Phuongchau Ba Nguyen
(74) *Attorney, Agent, or Firm*—Katten Muchin Rosenman LLP

(57) ABSTRACT

A common buffer memory control apparatus controls a common buffer memory which is used to store message data items each of which is divided into a plurality of cells based on an asynchronous transfer mode. The common buffer memory control apparatus includes a free block management table for managing whether each of blocks into which the common buffer memory divided is free or used, a block selecting unit for selecting a block of the common buffer memory which is free with reference to the free block management table, and a cell writing control unit for controlling a write operation for cells of a single message data item so that the respective cells of the single message data item are written in the block, selected by the block selecting means, of the common buffer memory.

10 Claims, 3 Drawing Sheets

COMMON BUFFER MEMORY CONTROL APPARATUS

BACKGROUND OF THE INVENTION

1. Field of the Invention

The present invention relates to a common buffer memory control apparatus such as an ATM switching system, and more particularly to a common buffer memory control apparatus applied to a message communication service in which message data formed of a plurality of cells is transmitted.

2. Description of the Related Art

An ATM switching system operated in an Asynchronous Transfer Mode is used in a broad-band integrated services digital network (B-ISDN). In such an ATM switching system, a switching apparatus using a common buffer memory carries out a routing operation for cells in an ATM network.

A conventional switching apparatus using the common buffer memory controls, using address chains, a read/write operation of the common buffer memory. FIG. 1 shows a conventional switching apparatus using the common buffer memory.

Referring to FIG. 1, the switching apparatus has a multiplexing unit (MUX) 31, a common buffer memory 32, an address pointer 33, a demultiplexing unit (DEMUX) 34, a routing information decoder (RTGDEC) 35, a writing address memory 36, a reading address memory 37, an output route number decoder 38 and an output route number counter 39. The address pointer 33 specifies reading and writing points in the common buffer memory 32.

The writing address memory 36 has memory areas WA-1 to WA-n each of which corresponds to one of output routes. The reading address memory 37 has memory areas RA-1 to RA-n each of which corresponds to one of the output routes.

Cells input from respective input lines (input-1~input-n) are multiplexed by the multiplexing unit 33 and output to the common buffer memory 32 cell by cell. The multiplexing unit 31 extracts routing information stored in a header portion of each cell. The routing information is then supplied to the routing information decoder 35. The routing information decoder 35 decodes the routing information and specifies a writing address memory area WA-i corresponding to an output route number i obtained by decoding the routing information.

The respective writing address memory areas WA-1~WA-n, corresponding to the output routes, stores writing addresses for cells in the common buffer memory 32. The writing address memory area WA-i specified by the routing information decoder 35 outputs a writing address stored therein to the address pointer 33.

The common buffer memory 32 stores a cell received from the multiplexing unit 31 at an address specified by the address pointer 33. In addition, when the next cell for the same output route is received, the address pointer 33 outputs an address at which the cell should be stored to the writing address memory area WA-i so that the contents of the writing address memory area WA-i is updated to the new address.

On the other hand, the cell written in the common buffer memory 32 is read out therefrom as follows. The output route number counter 39 successively outputs output route numbers in order. The output route number decoder 38 specifies a read address memory area RA-i corresponding to an output route number i.

The respective read address memory areas RA-1 to RA-n corresponding to the output routes store addresses of the common buffer memory 32 at which cells to be transmitted are stored. The read address memory area RA-i specified by the output route decoder 38 outputs an address stored therein to the address pointer 33. A cell stored at the address specified by the address pointer 33 is read out from the common buffer memory 32 and supplied to the demultiplexing unit 34.

In addition, the address pointer 33 outputs an address at which a cell to be next transmitted to the output route has been stored to the read address memory area RA-i. The contents of the read address memory area RA-i is thus updated to the new address.

When the cell is read out from the common buffer memory 32 and output to the demultiplexing unit 34, the area (address) of the common buffer memory 32 in (at) which the cell has been stored is opened. After this, the area of the common buffer memory 32 is used to write a cell received later.

The cells read out from the common buffer memory 32 are routed to output routes, by the demultiplexing unit 34, in accordance with routing information in the header portions of the cells. The cell are then output to corresponding output lines (output-1~output-n).

When the so-called message communication service in which a single message data item formed of a plurality of cells is transmitted is supported by using a such conventional switching apparatus as described above, the single message data item is stored in the common buffer memory 32 so as to be divided in to a plurality of cells.

Thus, in handling of the message data between the ATM layer and the upper layer, all addresses at which the respective cells of the single message data item should be processed. As a result, the process is complex and the quick supply of the message communication service deteriorates.

SUMMARY OF THE INVENTION

Accordingly, a general object of the present invention is to provide a novel and useful common buffer memory control apparatus in which the disadvantages of the aforementioned prior art are eliminated.

A specific object of the present invention is to provide a common buffer memory control apparatus in which the address control to process a single message data item formed of a plurality of cells can be simplified to be capable of quick message communication service.

The above objects of the present invention are achieved by a common buffer memory control apparatus controlling a common buffer memory which is used to store message data items each of which is divided into a plurality of cells based on an asynchronous transfer mode, said apparatus comprising: first management means for managing whether each of blocks into which said common buffer memory divided is free or used; block selecting means for selecting a block of said common buffer memory which is free based on information obtained by said first management means; and cell writing control means for controlling a write operation for a single message data item so that the respective cells of the single message data item are written in the block, selected by said block selecting means, of said common buffer memory.

According to the present invention, the write operation for a single message data item so that the single message data item is written in the same block of the common buffer memory. Thus, a reading control operation for cells of each of message data items can be simplified. In addition, the handling operation of the message data between the ATM layer and the upper layer can be rapidly and easily executed.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of a common buffer memory control apparatus according to an embodiment of the present invention.

Figure 1:
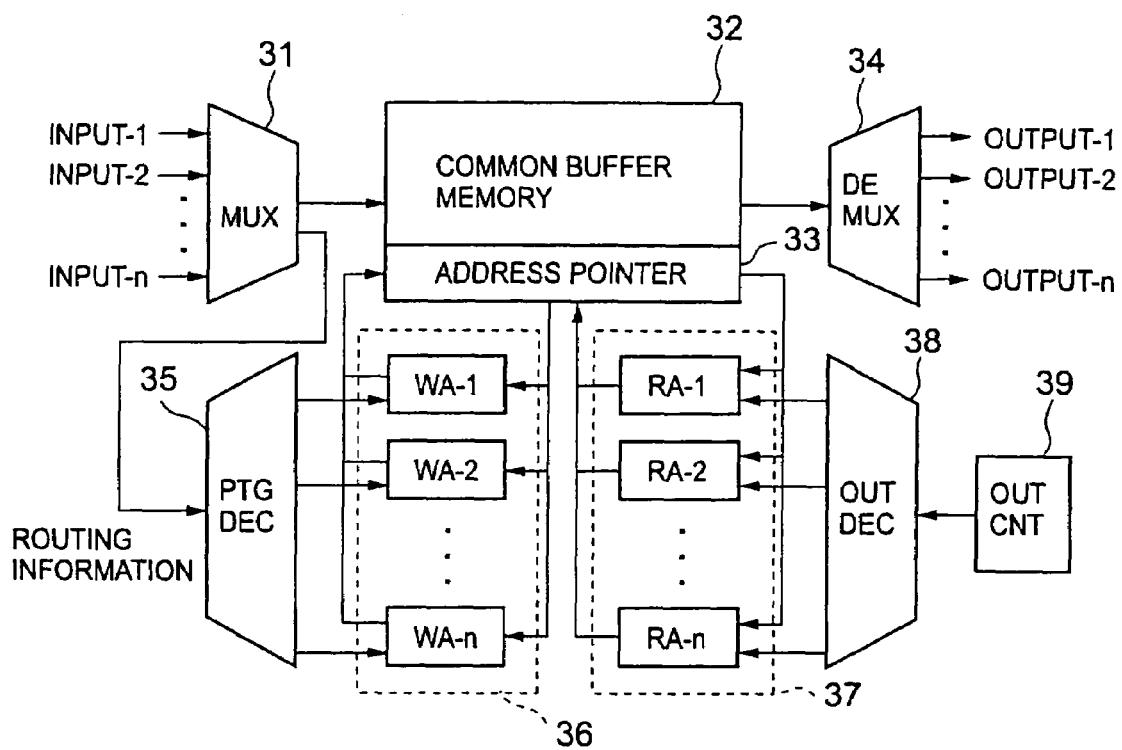
FIG. 1 is a block diagram illustrating a conventional switching apparatus using a common buffer memory.
Figure 2:
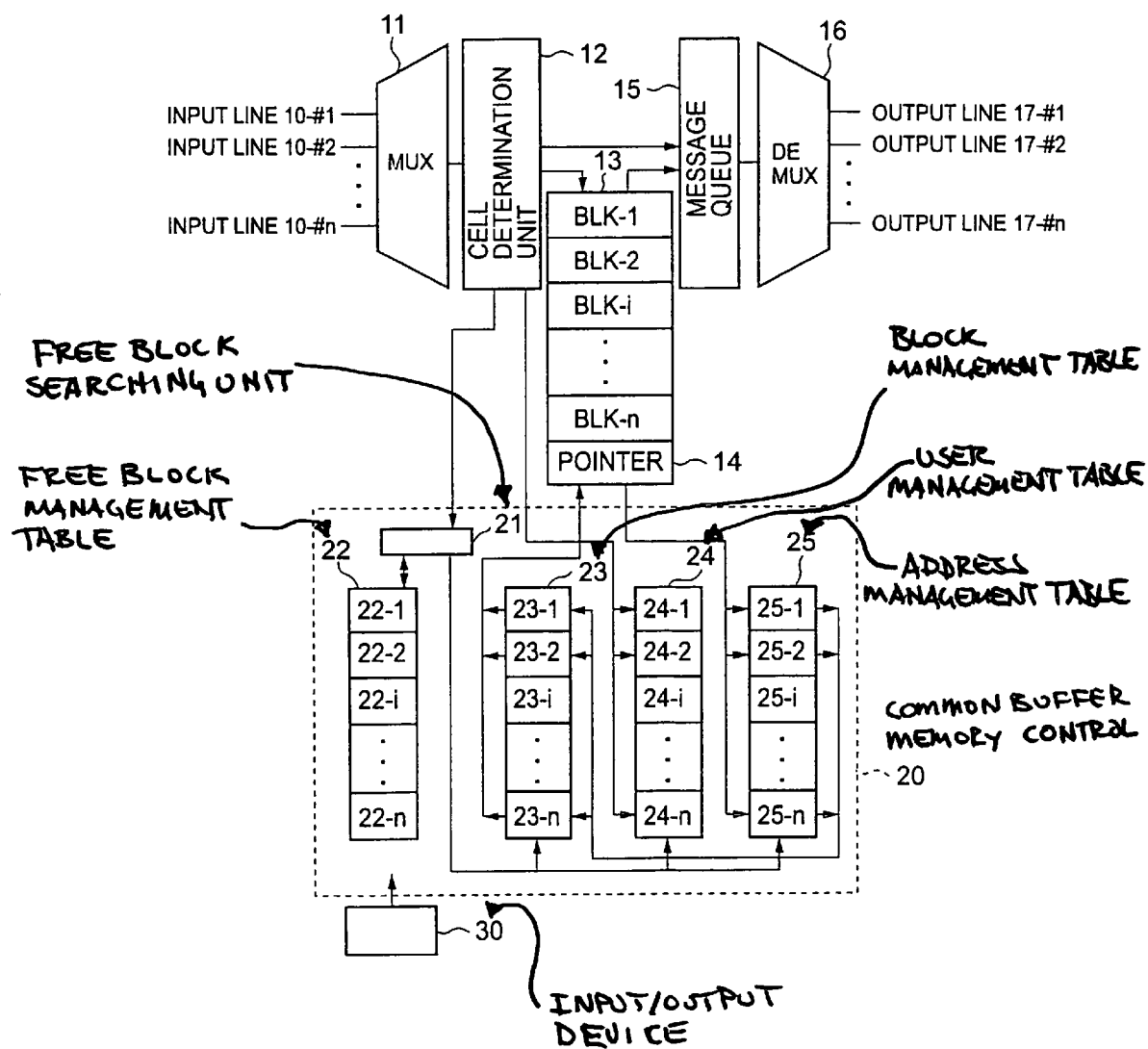
FIG. 2 is a block diagram illustrating a switching apparatus, using a common buffer memory, according to an embodiment of the present invention.

A switching apparatus, using a common buffer memory, according to an embodiment of the present invention is formed as shown in FIG. 2. Referring to FIG. 2, input lines 10-#1 to 10-#n are provided to the switching apparatus. The switching apparatus has a multiplexing unit 11, a cell determination unit 12, a common buffer memory 13, an address pointer 14, a message queue 15, a demultiplexing unit 16 and a common buffer memory control apparatus 20. The switching apparatus is connected with lines 17-#1 to 17-#n. The common buffer memory control apparatus 20 has a free block searching unit 21, a free block management table 22, a block management table 23, a user management table 24 and an address management table 25. An external input/output device 30 is coupled to the common buffer memory control apparatus 20.

The common buffer memory 13 is divided into blocks BLK-1 to BLK-n each of which is controlled to read and write cells.

The free block management table 22 areas 22-1 to 22-n each of which corresponds to one of the blocks BLK-1 to BLK-n of the common buffer memory 13. Each of the areas 22-1 to 22-n is used to store state information indicating whether a corresponding block of the common buffer memory 13 is free or used. The block management table 23 has areas 23-1 to 23-n each of which corresponds to one of the blocks BLK-1 to BLK-n. The areas 23-1 to 23-n stores write addresses. The user management table 24 has areas 24-1 to 24-n used to store identification numbers of users. The address management table 25 has areas 25-1 to 25-n each of which corresponds to one of the blocks BLK-1 to BLK-n. The areas 25-1 to 25-n are used to store last write addresses.

Figure 3:
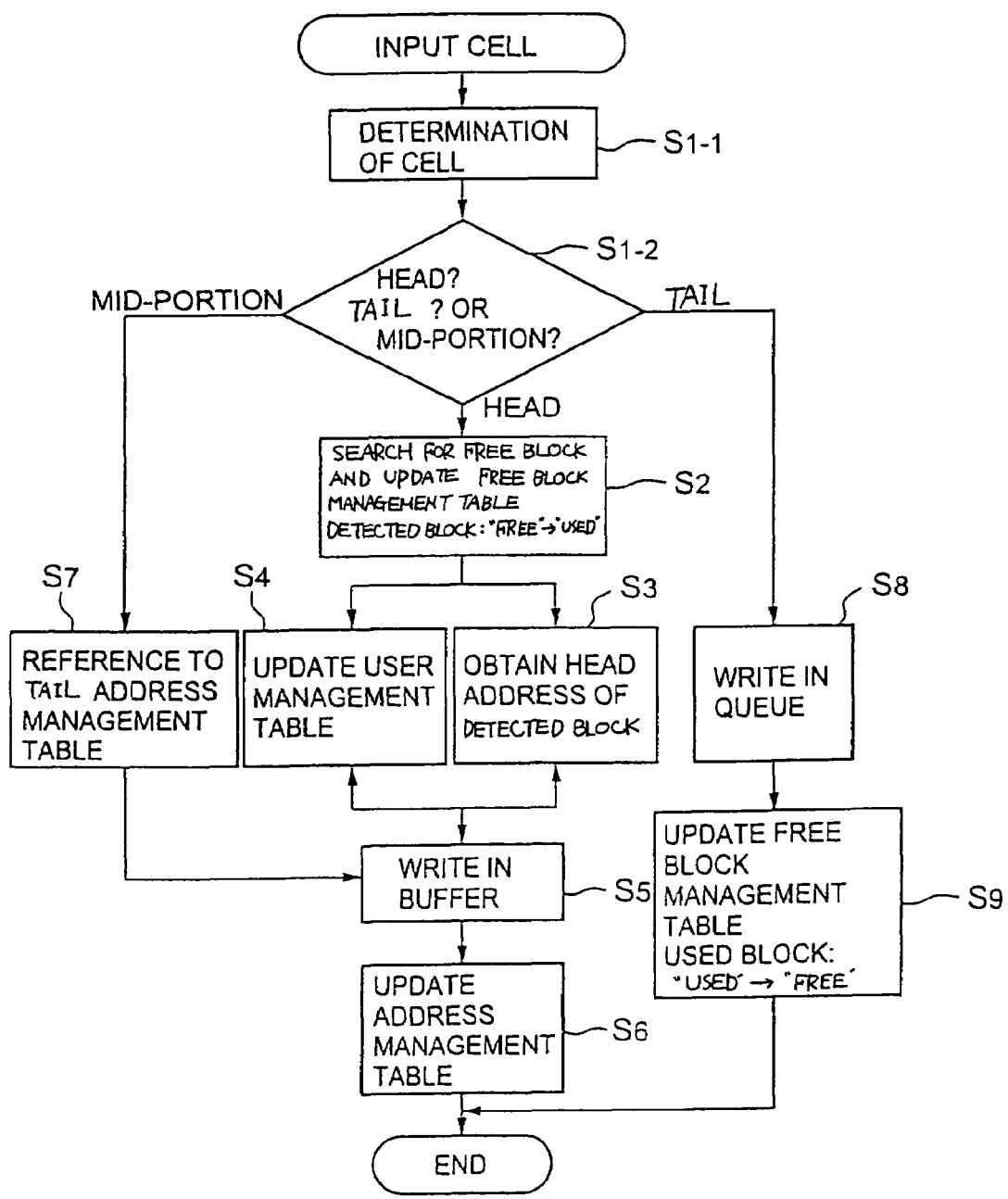
FIG. 3 is a flowchart illustrating a procedure of a control process for the common buffer memory.

The common buffer memory 13 is controlled in accordance with a procedure as shown in FIG. 3.

Cells received through the input lines 10-#1~10-#n are multiplexed by the multiplexing unit 11 and successively supplied to the cell determination unit 12 one by one. The cell determination unit 12 determines, based on additional information in a cell, whether the cell is a cell at the head of message data, a cell in a mid-portion of the message data or a cell at the tail of the message data (see S1-1 and S1-2 in FIG. 3). If it is determined that the received cell is the cell of the head of the message data, the cell determination unit 12 outputs to the free block searching unit 21 a signal indicating that the cell of the head of the message data has been received.

The free block searching unit 21 searches the areas 22-1 to 22-n of the free block management table 22 for an area storing the state information indicating that a corresponding block is free in order to select a block BLK-i of the common buffer memory 13 which is free, when receiving the signal indicating that the cell of the head of the message data has been received. Hereinafter, the block of the common buffer 13 which is free is referred to as a free block. When the free block is detected, the free block searching unit 21 changes the state information in the area 22-i, corresponding to the block BLK-i of the common buffer memory 13, of the free block management table 22 from "FREE" to "USED" (see S2 in FIG. 3).

The free block searching unit 21 then selects an area 23-i and an area 24-i, corresponding to the detected block BLK-i of the common buffer memory 13, of the block management table 23 and the user management table 24. The selected area 23-i of the block management table 23 obtains a head address of the block BLK-i based on an address stored in an area 25-i, corresponding to the selected area 23-i of the block management table 23, of the address management table 25 (see S3 in FIG. 3). The cell determination unit 21 updates the contents of the selected area 24-i of the user management table 24 based on a user identification number extracted from the received cell (see S 4 in FIG. 3).

The area 23-i of the block management table 23 outputs the head address of the block BLK-i of the common buffer memory 13 to the address pointer 14. The address pointer 14 specifies a write address using the address supplied from the area 23-i of the block management table 23. The cell supplied through the cell determination unit 12 is stored at the write address of the common buffer memory 13 (see S5 in FIG. 3).

In addition, the address pointer 14 outputs a write address at which the next received cell should be written to the area 25-i of the address management table 25. The area 25-i of the address management table 25 stores the new address as a last write address (see in FIG. 3).

If it is determined that a received cell is the cell in the mid-portion of the message data, a user identification number is extracted from information in the received cell. With reference to the area 25-i of the address management table 25 corresponding to an area 24-i of the user management table in which the extracted user identification number is stored, the last write address stored in the area 25-i of the address management table 25 is supplied to the area 23-i of the block management table 23 (see S7 in FIG. 3). When the area 23-i of the block management table 23 receives the last write address, the write operation using the address pointer 14 is performed in the same manner as in the above case. The received cell is thus stored in the block BLK-i of the common buffer memory 13. After the cell is written in the common buffer memory 13, the last write address in the area 25-i of the address management table 25 is updated (see S6 in FIG. 3). While cells in the mid-portion of the message data are being received, the above operation is repeatedly executed.

If it is determined that a received cell is the cell at the tail of the message data, the block BLK-i of the common buffer memory 13 in which the message data is stored is detected with reference to the user management table 24. All the contents of the block BLK-i are stored in the message queue 15 (see S8 in FIG. 3). The block BLK-i is opened so as to be free. The state information of the area 22-i, corresponding to the block BLK-i of the common buffer memory 13, of the free block management table 22 is changed to "FREE" indicating that the block is free (see S9 in FIG. 3). As a result, the block BLK-i of the common buffer memory 13 can be used for other message data after this.

The operation described above is executed in a case where there is neither lost cells nor erroneously inserted cells. Even if the head or tail of the message data is out of order caused by the loss cells and/or the erroneously inserted cells, the address control is simplified as cells of a single message data item are stored together in a single block of the common buffer memory 13. As a result, the handling operation for the message data between the ATM layer and the upper layer can be quickly and easily executed.

Thus, when the message data read out from the common buffer memory 13 is written in the message queue 15, various types of controls can be executed in accordance with abnormality of the message data. The message data may be overwritten in the message queue 15. The message data may be canceled and an error message and a retransmission request may be returned to the sender. The message data may be written in the message queue 15 and processed for protection. That is, processes suitable for the abnormality of the message data can be easily executed, so that the quality of the service can be improved.

In the above embodiment, after the cell at the head of the message data is received, the free block searching unit 21 searches for a free block of the common buffer memory 13. The free block searching unit 21 may search for a free block of the common buffer memory 13 before the cell at the head of the message data is received. In this case, cell can be further quickly written in the common buffer memory 13.

In addition, the number of blocks BLK-1~BLK-n of the common buffer memory 13 and the length of each of the blocks may be fixed. However, they may be also controlled based on traffic state information supplied from the external input/output device 30. In this case, the memory area of the common buffer memory 13 can be efficiently used.

Further, the common buffer memory 13 may be divided into a plurality of block groups each of which includes a plurality of blocks. Blocks of the same block group have the same length. Blocks of different block groups have different lengths. An address at which the cell at head of the message data should be stored is assigned to each block. Each of the block groups is independently searched for a free block. In this case, the memory area of the common buffer memory 13 can be efficiently used and the memory can be quickly accessed.

The cell determination unit 12 may controls the length of each block of the common buffer memory 13 based on information about the amount of message data extracted from a cell transmitted at the start of the message communication. In this case, if the amount of message data actually received is less than the length of the block controlled as described above, the remaining area of the block is opened so as to be capable of being used in the following message communication. The message management efficiently using resources can be executed. In a case where cells in the mid-portion of the message data are received, in a case where the cell at the head of message data is received before the cell at the tail of message data is received, and in a case where message data is abnormal so that a predetermined cell is not received after elapsing a predetermined time period, it may be determined that the amount of message data of cell actually received is less than the length of the block controlled as described above.

The present invention is not limited to the aforementioned embodiments, and other variations and modifications may be made without departing from the scope of the claimed invention.

The present invention is based on Japanese priority application No. 10-062530 filed on Mar. 13, 1998, the entire contents of which are hereby incorporated by reference.

What is claimed is:

1. A common buffer memory control apparatus controlling a common buffer memory which is used to store message data items each of which is divided into a plurality of cells based on an asynchronous transfer mode, said apparatus comprising:

first management means for managing whether each of a plurality of blocks into which said common buffer memory divided is free or used;

block selecting means for selecting one block of said common buffer memory which is free based on information obtained by said first management means, to use for a single data item;

user management means for managing the blocks of said common buffer memory by a user management table in which a block storing a head cell positioned at a head of the message data corresponds to user identification information extracted from the head cell;

cell writing control means for controlling a write operation for the single message data item so that the respective cells of the single message data item are accumulated in the one block, selected by said block selecting means, of said common buffer memory, wherein said cell writing control means controls, based on information obtained by said user management means, the write operation so that each of cells positioned in mid-portion of the message data is written in the block corresponding to the user identification information extracted from said each of the cells; and single message extracting means for extracting the respective cells written in the one block by said cell writing control means as the single message data item from the one block which is specified by the user identification information extracted from a cell at a tail of the single message data item when the cell at the tail of the single message data item is received.

2. The common buffer memory control apparatus as claimed in claim 1, wherein said first management means comprises:

a free block management table having areas each of which corresponds to one of the blocks of said common buffer memory, each of the areas of said free block management table storing information indicating whether a corresponding one of the blocks of said common buffer memory is free or used, wherein said block selecting means selects, with reference to said free block management table, the block which is free.

3. The common buffer memory control apparatus as claimed in claim 2, wherein said block selecting means comprises:

free block searching means for searching said free block management table for an area storing the information indicating that a corresponding block is free, wherein the block corresponding to the area obtained by said free block searching means is selected.

4. The common buffer memory control apparatus as claimed in claim 1, wherein said cell writing control means comprises:

second management means for managing addresses in each of the blocks of said common buffer memory; and address specifying means for specifying, based on information obtained by said second management means, an address in the block selected by said block selecting means every time one of cells of the single message data item is received, so that the cells of the single message data item are written at addresses specified by said address specifying means.

5. The common buffer memory control apparatus as claimed in claim 4, wherein second management means comprises:
a table having areas each of which corresponds to one of the blocks of said common buffer memory, each of the areas storing an address at which the next cell should be written, the address in each of the areas of said table being updated every time a cell is written in a corresponding block of said common buffer memory.

6. The common buffer memory control apparatus as claimed in claim 1, wherein a number of blocks of said common buffer memory and a length of each of the blocks are set at values corresponding to data supplied from an external input device.

7. The common buffer memory control apparatus as claimed in claim 1, wherein a length of each of the blocks of said common buffer memory is controlled base on information about an amount of information of the message data extracted from a cell.

8. The common buffer memory apparatus as claimed in claim 7, wherein, if the amount of information of the message data actually written in the block is less than the controlled length of the block, a remaining area of the block is opened so as to be used in following message communication.

9. The common buffer memory control apparatus as claimed in claim 1, wherein said user management means comprises:
a user management table having areas each of which corresponds to one of the blocks of said common buffer, each of the areas storing the user identification information extracted from the head cell which has been written in a corresponding block of said common buffer memory, wherein said cell writing control means controls the write operation with reference to said user management table.

10. The common buffer memory control apparatus a claimed in claim 1, wherein said block selecting means selects a block of said common buffer memory which is free in advance of receiving a head cell positioned at a head of the message data.

* * * * *